United States Patent [19]

Sweet et al.

[11] 4,099,741
[45] Jul. 11, 1978

[54] SUPPLEMENTAL AIR SPRING ASSEMBLY

[75] Inventors: Philip J. Sweet; Buck C. Hamlet; David L. Sweet, all of Fresno, Calif.

[73] Assignee: American Carrier Equipment, Inc., Fresno, Calif.

[21] Appl. No.: 747,880

[22] Filed: Dec. 6, 1976

[51] Int. Cl.² .................................................. B60G 11/46
[52] U.S. Cl. ........................................ 280/712; 267/31
[58] Field of Search ............... 280/711, 712, 713, 692, 280/693, 697, 698; 267/15 R, 18, 31, 54 R, 54 C

[56] References Cited

U.S. PATENT DOCUMENTS

| 1,179,182 | 4/1916 | Hofmann | 267/15 R |
| 1,181,546 | 5/1916 | Rosenthal | 267/15 R |
| 1,354,482 | 10/1920 | Hofmann | 267/18 |
| 1,379,321 | 5/1921 | Thompson | 267/18 |
| 1,412,349 | 4/1922 | Joel | 267/18 |
| 1,438,115 | 12/1922 | Joel | 267/18 |
| 2,303,904 | 12/1942 | Bell | 267/54 C |
| 2,323,065 | 6/1943 | Martins | 267/54 C |
| 3,866,894 | 2/1975 | Sweet | 280/712 |
| 3,970,293 | 7/1976 | Sweet | 280/712 |
| 4,033,608 | 7/1977 | Sweet | 267/31 |

FOREIGN PATENT DOCUMENTS 89,890   9/1922   Switzerland ........................ 280/711

Primary Examiner—Joseph F. Peters, Jr.
Assistant Examiner—John A. Carroll
Attorney, Agent, or Firm—Huebner & Worrel

[57] ABSTRACT

A supplemental air spring assembly for use in the front end suspension system of a truck or similar vehicle, characterized by a load dissipating arm adapted to be pivotally connected near its midportion to a trailing end portion for a leaf spring assembly for the truck, an air bag seated on the arm, near one end thereof, disposed in load supporting relation with the frame of the truck, and an articulated linkage connecting the opposite end portion of the arm to the frame for oscillatory motion about a horizontal axis.

5 Claims, 4 Drawing Figures

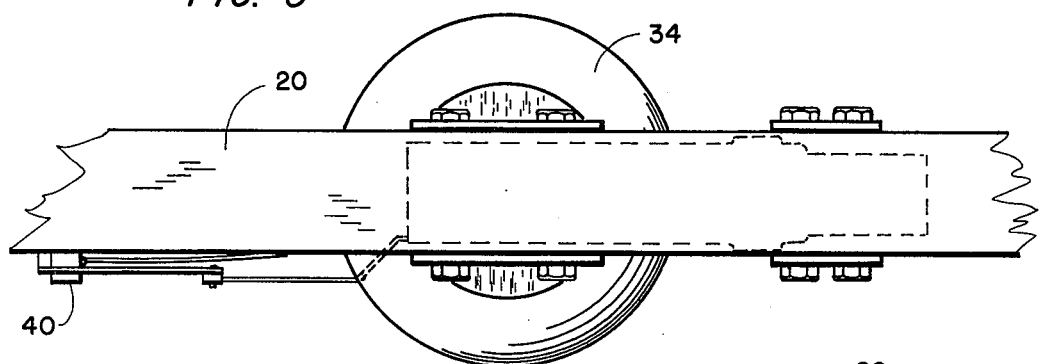
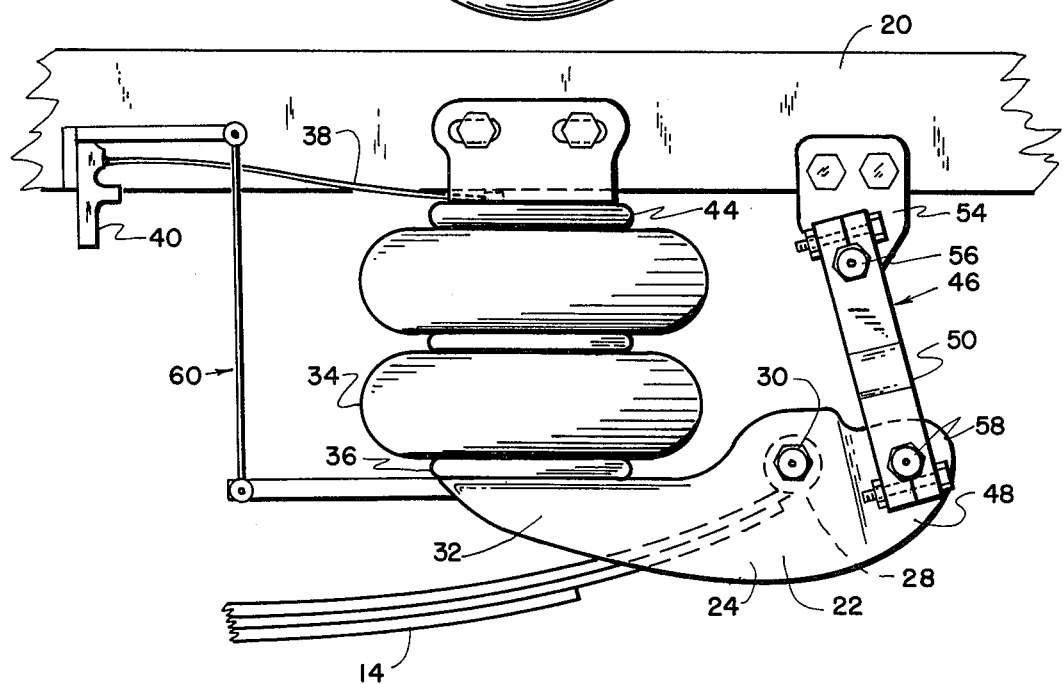

SUPPLEMENTAL AIR SPRING ASSEMBLY

BACKGROUND OF THE INVENTION

1. Field of the Invention

The invention generally relates to air-ride suspension systems for vehicles, and more particularly to a supplemental air spring assembly adapted to be provided in kit form for installation in a front end suspension system for a truck or similar vehicle.

2. Description of the Prior Art

The prior art, of course, is replete with air spring assemblies. One such assembly is disclosed and claimed in U.S. Letters Pat. No. 3,866,894, granted Feb. 18, 1975 to Philip J. Sweet et al. The disclosure of that patent is incorporated herein by reference thereto.

Additionally, U.S. Letters Pat. No. 3,140,083 discloses a supplemental air spring assembly intended to be employed with the front axle of trucks, where the truck is to be operated with heavy front end loads. The patentee recognizes that the installation of auxiliary or overload springs in heavy-duty trucks is difficult, due to the extent of the modification of vehicle understructure required in order to provide sufficient clearance for the auxiliary spring devices. The patentee further notes that a lack of adequate clearance between the axle and the frame has made it most difficult to provide for suitable auxiliary springing for the front end of vehicles.

As can readily be appreciated by those familiar with the trucking industry, shock reduction is particularly significant where a truck must travel over long stretches of highways and roads in various stages of disrepair. However, any suspension system employed as a front end suspension system must be capable of reducing the effects of shock loading without impairing steering capabilities or of giving an appearance of being characterized by a low safety factor.

Consequently, even though air springs of the type disclosed in the aforementioned patent to Sweet have proven to be satisfactory for their intended use, they have not proven to be particularly attractive for use as a supplemental air spring assembly for a front end suspension system. This results, at least in part, from the fact that the leaf spring assemblies are not totally captured. On the other hand, the system disclosed in U.S. Letters Pat. No. 3,140,083, aforementioned, tends to be excessively massive, complex and expensive.

It should, at this point, be apparent that the designers of suspension systems for front ends of trucks and the like are continuously plagued with the problem of overcoming shock loading without reducing the safety factor of a given suspension system and without adding substantial weight and bulk and excessive cost into the design, maintenance and operation of modified suspension systems.

It is therefore the general purpose of the instant invention to provide a practical solution to the perplexing problems aforementioned.

OBJECTS AND SUMMARY OF THE INVENTION

It is an object of the instant invention to provide a supplemental air spring assembly which overcomes the aforementioned difficulties and disadvantages.

Another object is to provide an improved supplemental air spring assembly particularly suited for use in modifying front end suspension systems for trucks and the like.

It is another object to provide a supplemental air spring assembly particularly adapted to be included in the front end suspension system for a motorized vehicle to provide for a modified suspension system unattended by reductions in load-carrying capabilities.

It is another object to provide for inclusion in a front end suspension system for motorized vehicles such as trucks and the like a supplemental air spring assembly which is simple to fabricate, economic to operate and maintain, and easily installed in existing suspension systems, without impairing the characteristics for safe operation.

These and other objects and advantages are achieved through the provision of a supplemental air spring assembly which includes a load dissipating arm adapted to be pivotally connected to the existing eye of a leaf spring assembly, an air bag positioned at one end of the arm and adapted to be disposed in a load supporting relation with the frame of the front end of a steerable vehicle, and an articulated linkage for connecting the arm, near its opposite end, to the frame of the vehicle while accommodating oscillatory motion of the opposite end of the arm about a horizontally extended axis.

BRIEF DESCRIPTION OF THE DRAWINGS

FIG. 3 is a top-plan view of the air spring assembly.

FIG. 4 is a fragmentary side elevational view, also on an enlarged scale, of the air spring assembly shown in FIGS. 1, 2 and 3.

DESCRIPTION OF THE PREFERRED EMBODIMENT

Figure 1:
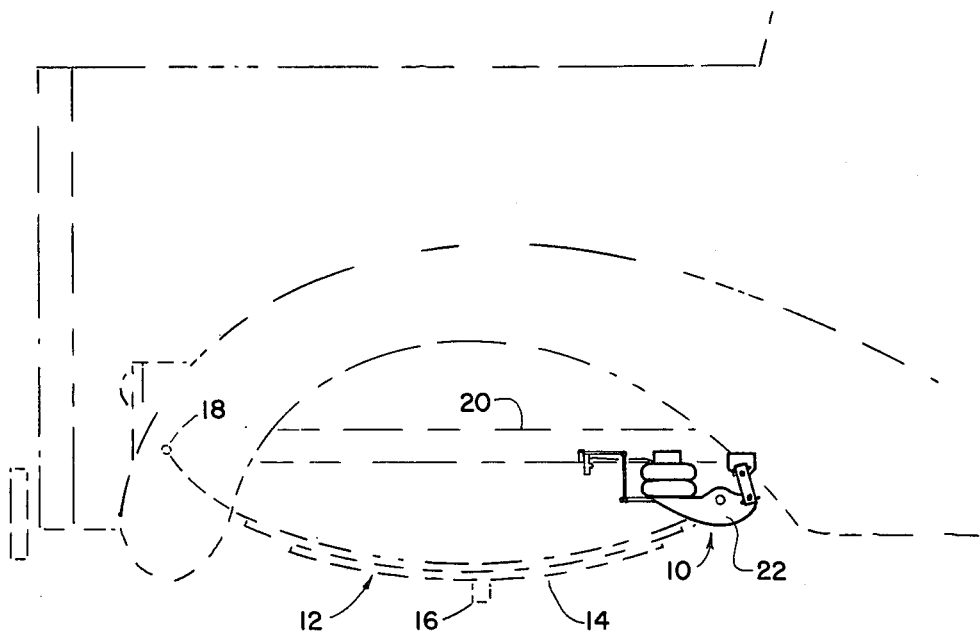
FIG. 1 is a side elevation, partially in phantom, depicting a use environment for a supplemental air spring embodying the principles of the instant invention.

Referring now to the drawings, with more particularity, wherein like reference characters designate like or corresponding parts throughout the several views, there is shown in FIG. 1 a supplemental air spring, generally designated 10, which embodies the principles of the instant invention.

As depicted in FIG. 1, the air spring assembly 10 is incorporated in a front end suspension system, generally designated 12, for a truck or similar motorized vehicle, not designated. It is to be understood, however, that the front end suspension system 12 includes a pair of leaf spring assemblies, only one of which is shown, designated 14. The leaf spring assembly 14 is, in turn, mounted transversely of a suitable axle, the type of which is dictated by the use characteristics of the vehicle.

Moreover, it is to be understood that the leaf spring assembly 14 is connected at its leading end, relative to the intended direction of normal travel for the vehicle, to a longitudinal frame member 20 provided for support of the vehicle. It should, therefore, be appreciated that the vehicle, leaf spring assembly and supporting axle are of known design. Therefore, a more complete description of the vehicle and its leaf spring assembly is omitted in the interest of brevity.

As best illustrated in FIG. 1, the air spring assembly 10 includes a force dissipating arm 22 of an elongated configuration. As a practical matter, the arm 22 is of an inverted U-shaped configuration and includes a pair of side plates 24, FIG. 4, between which is extended a bushing received within an eye 28 of the leaf spring assembly 14. A suitable pin 30 extends through a pair of coaxially aligned apertures formed in the side plates 24 of the arm 22 and is secured in place by any suitable means, such as a nut, not designated. It is to be understood that the force dissipating arm 22 is supported for pivotal motion relative to the end of the leaf spring assembly 14, about a pivotal axis established by the pin 30 and coincident with the longitudinal axis thereof.

The force dissipating arm 22 further includes an extended end portion 32 which receives an air bag 34 disposed in a load supporting relationship with the frame 20. The particular manner in which the air bag is mounted on the force dissipating arm 22 is a matter of convenience, however, bolts threaded into blind bores formed in a base plate, designated 36, provided for the air bag 34, serve quite satisfactorily for this purpose. A similar arrangement is disclosed in U.S. Letters Pat. No. 3,866,894, aforementioned.

As shown in the drawings, the air bag 34 is a double convolute air bag which is connected through pneumatic lines 38 to a leveling valve 40, connected in a circuit adapted to function in the manner generally described in the aforementioned United States Letters Patent to Sweet et al. Of course, the particular type of air bag employed is not deemed to be critical. For example, a single convolute air bag can be employed equally as well. The purpose of the bag 34 is, of course, to dissipate as well as to transfer forces between the frame member and the leaf spring member 14 via the force dissipating arm 22, as is fully appreciated by those familiar with air springs for suspension systems.

To the frame member 20 a suitable bracket, not designated, is bolted or otherwise rigidly secured. This bracket includes a base web, also not designated, to which is joined a top plate 44, FIG. 4, for the air bag 34. Consequently, it should be apparent that the air bag 34 is so disposed as to be located between the opposite ends of the leaf spring assembly 14 and is loaded by the frame member 20. Thus a reduction in the space required in the mounting of the air bag is achieved.

In order to stabilize the force dissipating arm 22, as the air bag 34 is loaded in a reversely varying mode, a stabilizing linkage, generally designated 46, is provided. This linkage pivotally couples the trailing end portion 48 of the arm 22 to the frame member 20. The linkage 46 is an articulated linkage and includes a rigid pivotal link 50 which serves to act in opposition to the force applied to the air bag 34 for thus restraining the arm 22 against rotation about the pin 30.

As should be apparent from a cursory review of FIG. 4, due to the moments occurring about the pin 30, the link 50 is placed in compression as the air bag 34 is loaded in compression, and as the air bag 34 is loaded in tension, the link 50 is similarly loaded. Of course, as the air bag 34 is operatively loaded, the spatial relationship of the pin 30 to the frame member 20 is varied as a consequence of flexion experienced by the leaf spring assembly 14 in accordance with the inherent characteristics of leaf spring design.

In order to accommodate changes in position for the pivot pin 30, relative to the frame member 20, the link 50 is pivotally connected to a bracket 54 affixed to the frame member 20. This bracket is located in substantially the same position as would have been a shackle for coupling the leaf spring assembly to the frame member, had not the air spring assembly 10 of the instant invention been incorporated.

Figure 2:
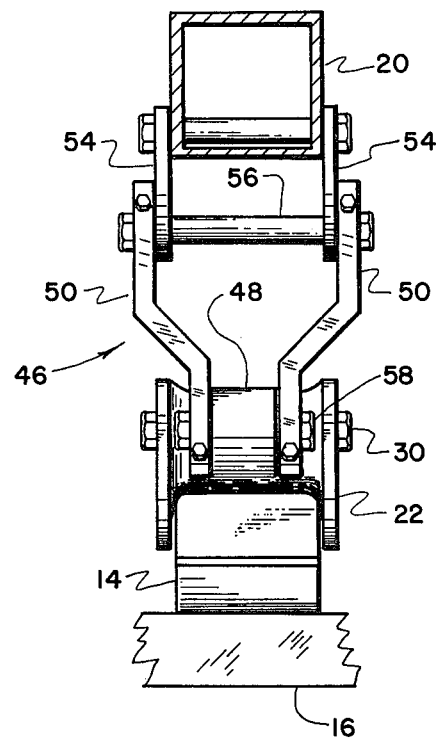
FIG. 2 is a partially sectioned end view of the supplemental air spring shown in FIG. 1, but on somewhat of an enlarged scale.

As a practical matter, in order to accommodate pivotal motion, a pin 56 is provided for pivotally interconnecting the link 50 with the bracket 54. Similarly, the link 50 is connected to the end portion 48 of the arm 22 by a suitable pin 58, as best illustrated in FIG. 2. Thus each of the pins 56 and 58 serve to accommodate pivotal motion of the link 50 relative to the bracket 54 and the arm 22. The pivotal motion thus afforded the link 50 facilitates vertical and horizontal motion of the force dissipating arm 22, in a vertical plane, for thus accommodating repositioning of the arm 22 as load conditions for the bag 34 are varied.

As a practical matter, a leveling linkage, generally designated 60, is connected between the force dissipating arm 22 and the leveling valve 40 so that the on-off condition of the valve 40 is varied as the position of the arm 22 is varied under changing load conditions for the air bag 34. The valve 40 forms no specific part of the instant invention, however, the manner in which the leveling valve 40 is controlled is more fully described in the patent to Sweet et al., aforementioned.

It should, in view of the foregoing, be apparent that the arm 22, in effect, remains in a substantially parallel relationship with the frame member 20 as the air bag 34 is in operation reversely loaded, due to the fact that the pivotal axis established by the pin 30 is a floating axis and one end of the force dissipating arm 22 is restrained by the articulated linkage 46. Since the arm 22 tends to remain in a substantially horizontal disposition, the air bag 34 tends to be deformed in a substantially uniform manner. Thus the severity of the localizing of fatigue for the bag 34 tends to be reduced substantially. This characteristic, along with the fact that the leaf spring 14 remains captured, tends to enhance longevity and reduce the likelihood of malfunction during operation over roads in severe stages of disrepair.

OPERATION

It is believed that in view of the foregoing description the operation of the device embodying the instant invention is apparent. However, it will as this point be reviewed briefly.

With the supplemental air spring assembly 10 interconnected, and thus incorporated in a suspension system, such as a front end suspension system for a selected vehicle, the suspension system is economically modified. As the vehicle is operated, reverse loading of the air bag 34 occurs causing the load applied by the frame member 20 to the force dissipating arm 22, via the air bag 34 to vary between compressive and tensile loads. As the load is varied, the leaf spring assembly 14 undergoes flexion, whereupon the axis of the pivot pin 30 changes its position relative to the frame member 20. The link 50 acts about the pivotal axis, established by the pin 30, in opposition to the load applied to the arm 22 by the air bag 34. Since the pin 30 is free to move vertically, as well as horizontally, flexion of the leaf spring assembly 14 is accommodated. Of course, as the bag 34 is foreshortened under a compressive load, the leveling valve 40 is activated, through the linkage 60 so that additional air is introduced from the valve 40 to the air bag 34. Similarly, as the bag 34 is elongated under tensile loads, the linkage 60 actuates the leveling valve 40 for reducing pressure within the bag 34. Consequently, pressurization of the air bag 34 is dictated by the position of the force dissipating arm 22. Thus, a portion of the forces of the loads applied by the frame member 20 is dissipated by the air bag 34, while the remaining forces are transmitted to the leaf spring assembly, while the leaf spring assembly 14 remains captured. Due to the floating characteristics of the pivotal axis for the arm 22, deformation of the air bag 34 remains substantially uniform throughout.

It should, therefore, be apparent that the supplemental air spring assembly 10 embodying the principles of the instant invention provides a satisfactory solution for the perplexing problem of incorporating a practical and safe supplemental air spring assembly in the front end suspension system for motorized vehicles such as trucks, tractor-trailer rigs and the like.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by letters patent is:

1. In a front end suspension system for a motorized vehicle characterized by a wheel-supported axle having a transversely oriented leaf spring assembly mounted on the axle and attached at its leading end to a longitudinal frame member for the vehicle, a supplemental air spring assembly comprising:

a load dissipating arm pivotally connected near its midportion to the trailing end of the leaf spring assembly, an air bag seated on one end portion of the arm and disposed between a pair of parallel planes intersecting the opposite ends of the leaf spring assembly in load supporting relation with said frame member, and coupling means including a rigid link connecting the opposite end portion of the arm to said frame member restraining the arm for oscillatory motion about a horizontal axis disposed in space relation therewith.

2. The air spring assembly of claim 1 further comprising means connected to said air bag for controlling pressurization thereof.

3. In combination with the front end suspension system for a truck, an improved supplemental air spring assembly comprising:

A. a load dissipating arm pivotally connected at its midportion to the trailing end portion of a leaf spring assembly for the truck;

B. an air bag seated on said arm near one end thereof disposed in load supporting relation with a longitudinal frame member for the truck; and C. means for accommodating displacement of said arm relative to said frame member including an articulated linkage depending from the frame member and connected to said arm in trailing relation with said air bag.

4. The air spring assembly of claim 3 wherein said articulated linkage includes a rigid link having one end pivotally connected to the arm and one end adapted to be connected for pivotal movement about an axis passing through said frame member.

5. The air spring assembly of claim 4 further comprising a bag pressurizing system connected to said air bag for controlling pressurization of the air bag.

* * * * *

UNITED STATES PATENT AND TRADEMARK OFFICE
CERTIFICATE OF CORRECTION

PATENT NO. : 4,099,741
DATED : July 11, 1978
INVENTOR(S) : Philip J. Sweet; Buck C. Hamlet; David L. Sweet It is certified that error appears in the above–identified patent and that said Letters Patent are hereby corrected as shown below:

Column 4, line 41, delete "as" and substitute ---at---.

Signed and Sealed this

Twenty-sixth Day of December 1978

[SEAL]

Attest:

RUTH C. MASON
*Attesting Officer*

DONALD W. BANNER
*Commissioner of Patents and Trademarks*